(No Model.)

M. PETERS.
POST HOLE AUGER.

No. 427,009.  Patented Apr. 29, 1890.

WITNESSES.
Gustav Bohn.
D. B. Griffith.

INVENTOR.
Mahlon Peters.
By C. P. Jacobs
Atty.

UNITED STATES PATENT OFFICE.

MAHLON PETERS, OF OAKLANDON, ASSIGNOR OF ONE-HALF TO JOHN D. LOWDEN, OF LAWRENCE, INDIANA.

POST-HOLE AUGER.

SPECIFICATION forming part of Letters Patent No. 427,009, dated April 29, 1890.

Application filed December 23, 1889. Serial No. 334,761. (No model.)

*To all whom it may concern:*

Be it known that I, MAHLON PETERS, of Oaklandon, county of Marion, and State of Indiana, have invented certain new and useful Improvements in Post-Hole Augers; and I do hereby declare that the following is a full, clear, and exact description thereof, reference being had to the accompanying drawings, in which like letters refer to like parts.

My invention relates to the construction of post-hole augers; and it consists, mainly, in making a part of the auger-head movable, and will be understood from the following description.

Figure 1:
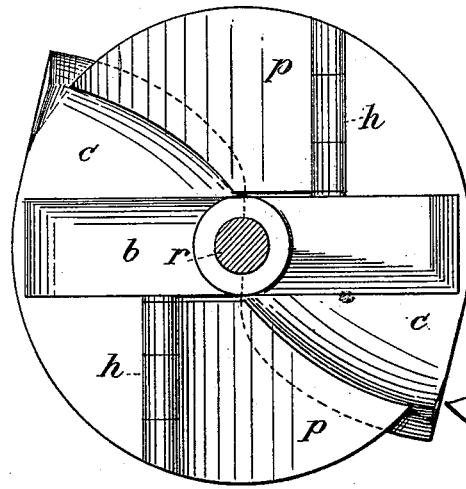
Figure 2:
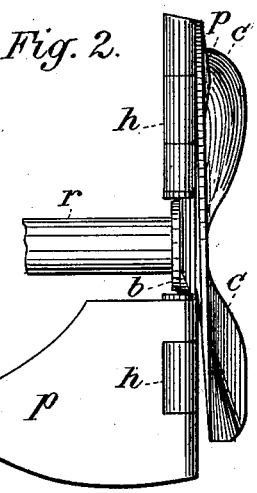
Figure 3:
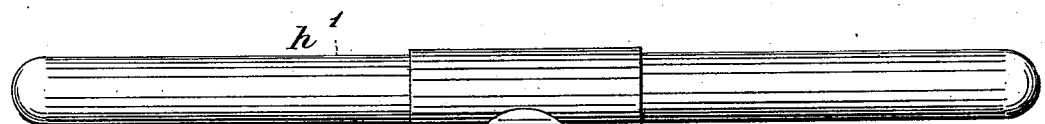
Figure 4:
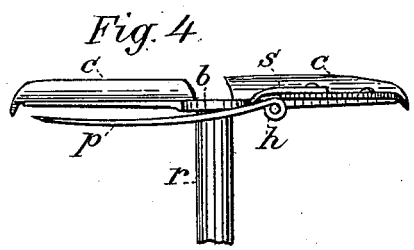
Figure 5:
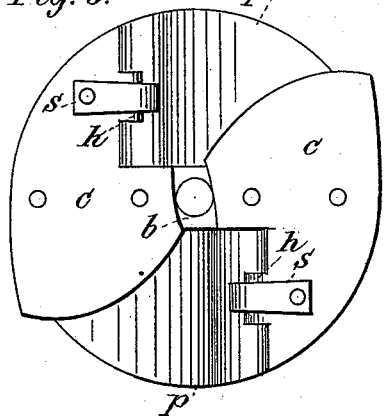

In the drawings, Figure 1 is a top plan view of my device. Fig. 2 is an edge view of the same. Fig. 3 is an elevation of the entire device in operative position, the dotted lines indicating the position of the hinged plate when thrown up. Fig. 4 is an edge view, and Fig. 5 is a bottom plan view, of the auger-head, showing the holding-springs.

In detail the auger-head consists of circular cutters $c$, connected to a strengthening-bar $b$, the lip of the cutters extended on each side some distance beyond the periphery of the head, so as to facilitate the withdrawal of the auger and to make it work more easily in the ground. The other part of the head is formed of the plates $p$, which are hinged at $h$ to the cutters. When the cutters are working in the ground, the hinged plates allow the dirt to pass up easily between them and the cutters, and the device does not present the obstruction to the downward movement of the cutters which is usual where the head part of the auger is made solid. When the device is lifted, the weight of the earth will hold the plates $p$ in place, and, as will be seen, they are made to lap over and rest upon the top of the cutters the distance indicated by the dotted lines in Fig. 1.

$r$ is a rod, which is screwed into the auger-head, and $h'$ is the handle connected therewith for operating the device.

$s$ are springs riveted to the cutters $c$ and projecting over their edges, their ends slightly upturned to bear against the hinged plates $p$, and when the latter are pressed down by the weight of the earth the load operates against the spring, the tendency of the latter being to raise the hinge-plates $p$ to let the soil work through between them and the cutters and to make the bearing of these plates when loaded elastic. The weight of the soil will not then entirely close the opening between the cutters $c$ and plates $p$, as the springs hold them apart.

What I claim as my invention, and desire to secure by Letters Patent, is the following:

1. A post-auger comprising the cutters $c$ and plates $p$, hinged thereto, and springs $s$ for holding them apart to let the soil through, substantially as described.

2. A post-auger comprising cutters $c$, secured to a bar $b$, plates $p$, hinged to such cutters, and springs $s$, fastened beneath the cutters and normally bearing against the under side of the plates $p$ to hold them apart from and above the cutters, all combined substantially as described.

In witness whereof I have hereunto set my hand this 15th day of October, 1889.

MAHLON PETERS.

Witnesses:
C. P. JACOBS,
E. B. GRIFFITH.